United States Patent
Cook et al.

(10) Patent No.: US 6,780,132 B2
(45) Date of Patent: Aug. 24, 2004

(54) SELECTIVELY ACTUATED TRANSFER CASE

(75) Inventors: Dennis Cook, Royal Oak, MI (US); Richard Michael Krzesicki, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/211,603

(22) Filed: Aug. 2, 2002

(65) Prior Publication Data

US 2004/0023743 A1 Feb. 5, 2004

(51) Int. Cl.⁷ ............................................. B60K 23/08
(52) U.S. Cl. ....................... 475/149; 192/84.6; 192/94; 180/247; 74/665 GE
(58) Field of Search .................. 180/251, 247, 180/248; 74/665 GE; 475/149; 192/84.6, 94, 20

(56) References Cited

U.S. PATENT DOCUMENTS

| | | | | |
|---|---|---|---|---|
| 3,732,447 A | * | 5/1973 | Perhats ........................ | 310/76 |
| 4,607,180 A | | 8/1986 | Stoody | |
| 4,895,236 A | * | 1/1990 | Sakakibara et al. ........ | 192/84.6 |
| 5,199,325 A | * | 4/1993 | Reuter et al. ................. | 192/94 |
| 5,332,060 A | * | 7/1994 | Sperduti et al. ............ | 180/247 |
| 5,462,496 A | * | 10/1995 | Dick et al. ................... | 180/248 |
| 5,738,604 A | * | 4/1998 | Dick .......................... | 180/249 |
| 6,079,535 A | | 6/2000 | Mueller et al. | |
| 6,167,997 B1 | * | 1/2001 | Keeney ....................... | 192/94 |
| 6,484,857 B2 | * | 11/2002 | Vonnegut et al. .......... | 192/84.6 |
| 6,488,110 B2 | * | 12/2002 | Price .......................... | 180/251 |
| 2002/0074206 A1 | * | 6/2002 | Grosspietsch et al. ........ | 192/94 |
| 2002/0100657 A1 | | 8/2002 | Vonnegut et al. | |

FOREIGN PATENT DOCUMENTS

DE 3908478 A1 10/1989
EP WO 01/73312 A1 4/2001

* cited by examiner

Primary Examiner—Charles A Marmor
Assistant Examiner—Eric M. Williams
(74) Attorney, Agent, or Firm—Brinks Hofer Gilson & Lione

(57) ABSTRACT

A transfer case for use in motor vehicles for transferring drive torque from a powertrain to first and second drivelines includes a first output shaft that is connected to the powertrain of the vehicle and is adapted to transmit drive torque from the powertrain to the first driveline. A second output shaft is adapted to transmit drive torque to the second driveline, and a transfer clutch is adapted to transfer drive torque from the first output shaft to the second output shaft. A ball screw assembly is adapted to actuate the transfer clutch.

8 Claims, 5 Drawing Sheets

_US 6,780,132 B2_

SELECTIVELY ACTUATED TRANSFER CASE

TECHNICAL FIELD

The present invention generally relates to an automotive transfer case. More specifically, the present invention relates to an automotive transfer case which includes a ball screw actuated clutch pack to allow selectively actuation of the transfer case.

BACKGROUND

In four-wheel drive vehicles, a power transfer system is used to transfer drive torque to all four wheels. In many vehicles, a transfer case is interconnected between the first and second drivelines which is equipped with a dog-type mode clutch that can be selectively engaged for rigidly coupling the secondary driveline to the primary driveline to establish a part-time four-wheel drive mode. When the mode clutch is disengaged, all drive torque is delivered to the primary driveline for establishing a two-wheel drive mode.

In some four-wheel drive vehicles the transfer case is equipped with an electronically-controlled transfer clutch pack in place of the mode clutch. The clutch pack is operable for selectively directing drive torque to the secondary wheels when traction is lost at the primary wheels for establishing an on-demand four-wheel drive mode. Typically, the clutch pack is a multi-plate clutch assembly installed between the primary and secondary output shafts of the transfer case and which is actuated by a power-operated actuator in response to control signals sent from a controller. The vehicle operator is permitted to select between the two-wheel drive mode and the part-time four-wheel drive mode in addition to on-demand four-wheel drive mode. Specifically, when the two-wheel drive mode is selected, the clutch pack is released for delivering all drive torque to the first output shaft. In contrast, when the part-time four-wheel drive mode is selected, an axial force is placed upon the clutch pack such that the clutch pack is fully engaged for effectively locking the second output shaft to the first output shaft.

One way of applying an axial force onto a clutch pack of this type is with a ball ramp. A ball ramp is comprised of a pair of plates having opposing channels formed therein. Within the channels are balls. The height of the balls is such that the plates are not allowed to touch. The channels are ramped such that when one plate rotates relative to the other, the balls will roll up the ramped channels and force the plates apart, thereby producing an axial force.

Over time, the channels within the plates will wear, which means less axial movement of the plates occurs as the balls roll up the ramped surfaces. This reduces the amount of axial force produced by the ball ramp, and affects the performance of the clutch pack. The only way to repair this condition is to reposition or replace the ball ramp. Further, a ball ramp will only move a limited distance away from the clutch pack. Therefore, the clutch pack cannot be relieved further to allow cooling.

Therefore, there is a need for a transfer case having a clutch pack for selectively engaging the primary and secondary drive shafts of the vehicle which includes a device that applies an axial force to the clutch pack and can be tuned to accommodate for wear of the clutch pack and wear within the device, as well as allowing the device to be backed away from the clutch pack to allow the clutch pack to cool.

DETAILED DESCRIPTION OF THE PREFERRED EMBODIMENTS

The following description of the preferred embodiments of the invention is not intended to limit the scope of the invention to these preferred embodiments, but rather to enable any person skilled in the art to make and use the invention.

Figure 1:
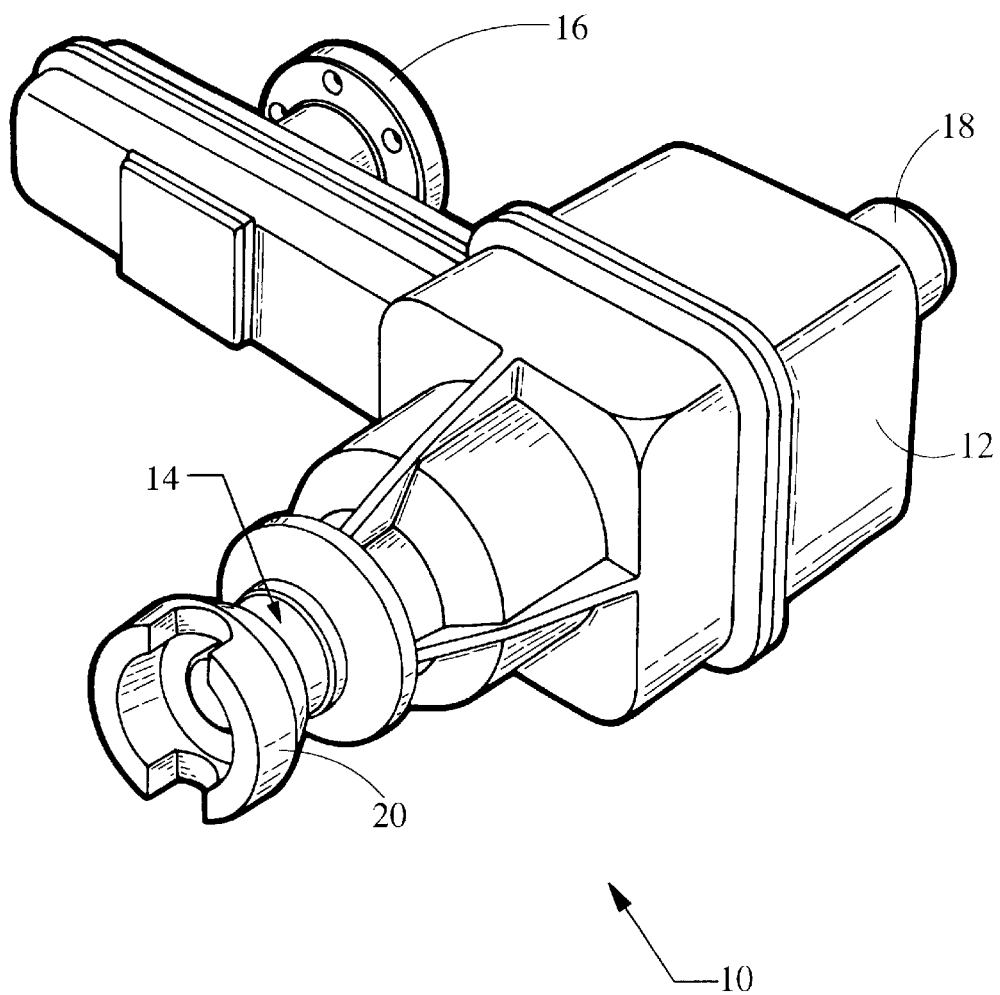
FIG. 1 is a perspective view of a transfer case of a first preferred embodiment.

Referring to FIG. 1, a transfer case for an automotive vehicle is shown generally at 10. The transfer case 10 includes a housing 12 having a first output shaft 14 and a second output shaft 16 rotatably mounted therein. The first and second output shafts 14, 16 are mounted substantially parallel to one another.

Figure 2:
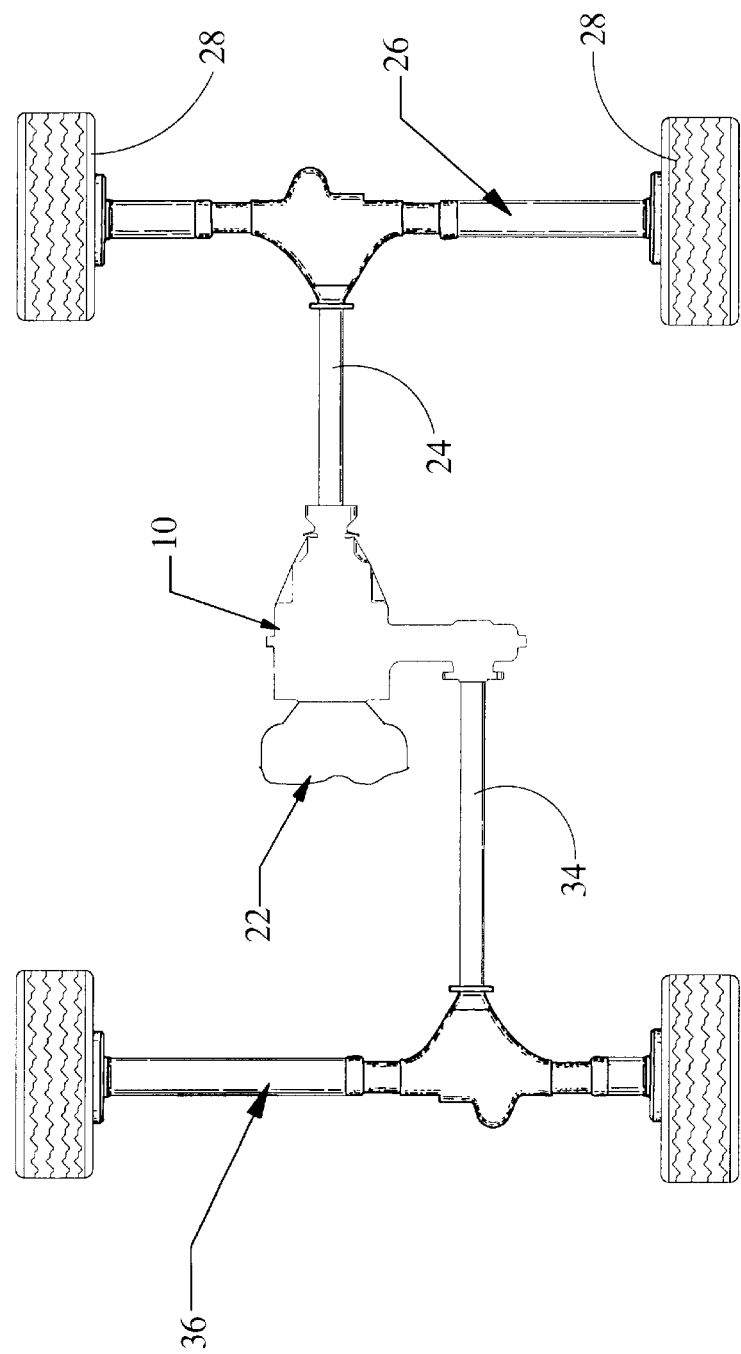
FIG. 2 is a schematic view of the drive train system of an automobile having the transfer case shown in FIG. 1.

Referring to FIG. 2, the first output shaft 14 is adapted to interconnect a powertrain of the vehicle to a first drive line of the vehicle. The first output shaft 14 has a first end 18 and a second end 20. Preferably, the first end 18 of the first output shaft 14 is adapted to connect to a transmission 22 of the vehicle, and the second end 20 of the first output shaft 14 is adapted to connect to a rear drive shaft 24. The rear drive shaft 24 is connected to a rear axle 26 of the vehicle, such that rotational motion is transmitted from the transmission 22, through the first output shaft 14 to the rear drive shaft 24, and to the rear axle 26, to provide drive torque to the rear wheels 28.

A second output shaft 16 is adapted to connect to a second drive line of the vehicle. The second output shaft 16 is rotatably mounted within the transfer case 10 and is substantially parallel to the first output shaft 14. The second output shaft 16 includes a first end 30 which is adapted to connect to a front drive shaft 34. The front drive shaft 34 is connected to a front axle 36 of the vehicle, such that rotational motion of the second output shaft 16 is transmitted through the front drive shaft 34 to the front axle 36.

Figure 3:
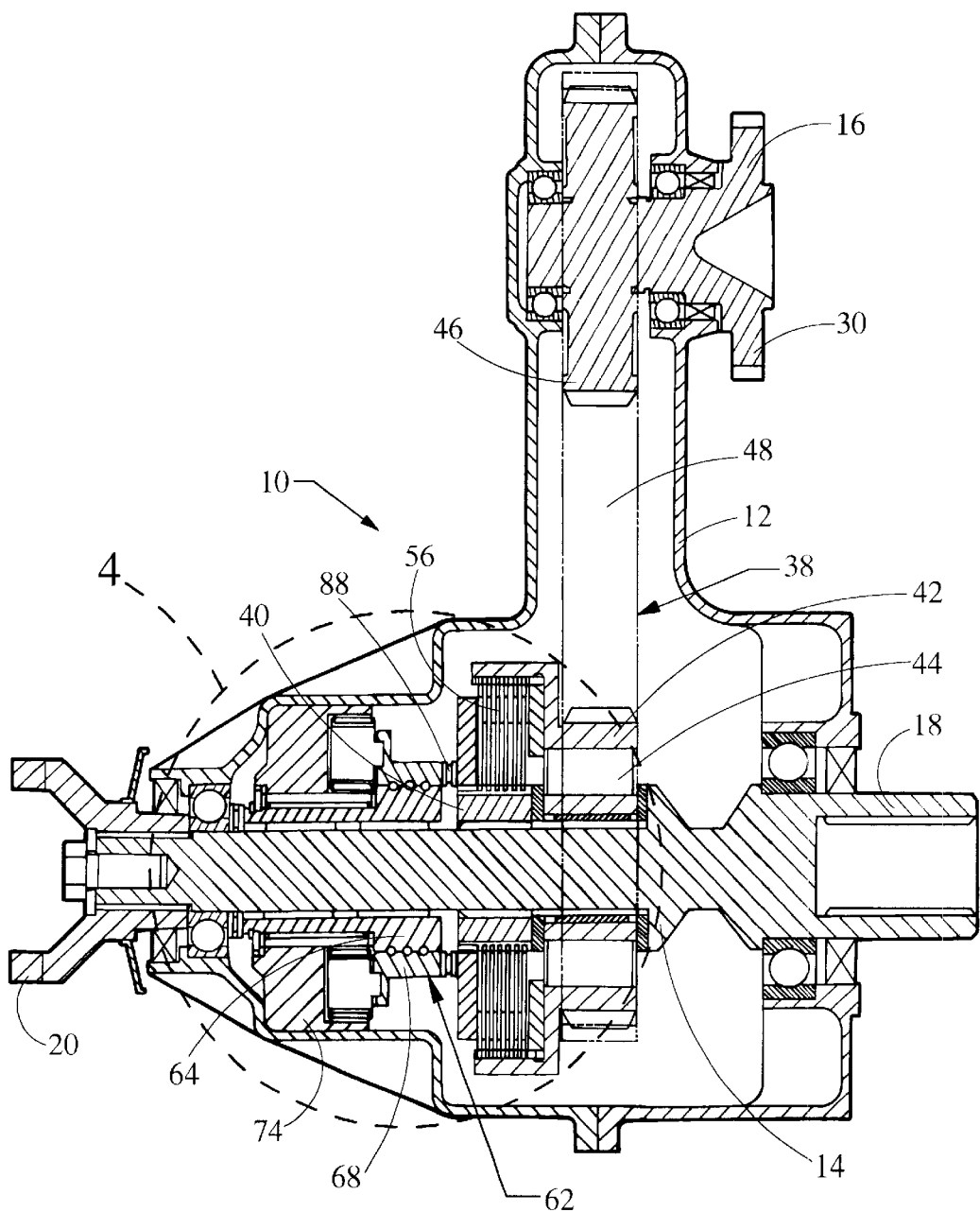
FIG. 3 is a sectional view taken along line 3—3 of FIG. 2.

Referring to FIG. 3, a transfer clutch 38 is mounted within the housing 12 and interconnects the first and second output shafts 14, 16. The transfer clutch 38 is adapted to selectively transfer rotational motion from the first output shaft 14 to the second output shaft 16. Preferably, the transfer clutch 38 includes a first clutch member 40 that is fixed to the first output shaft 14 and a second clutch member 42 that is rotatably mounted to the first output shaft 14 and is rotationally coupled with the second output shaft 16.

Preferably, the second clutch member 42 includes a first sprocket 44 mounted thereon, and the second output shaft 16 includes a second sprocket 46. Each of the sprockets 44, 46 includes a plurality of teeth extending outwardly, and a chain 48 extends around the first and second sprockets 44, 46 such that rotation of the first sprocket 44 is transferred to the second sprocket 46. Alternatively, the second clutch member 42 could include a first pulley and the second output shaft 16 could include a second pulley, whereby a belt extends around the first and second pulleys to frictionally engage the first and second pulleys and transfer rotational motion from the first pulley to the second pulley.

The transfer clutch is adapted to selectively lock the second clutch member 42 to the first clutch member 40, thereby locking the second clutch member 42 to the first output shaft 14 and transferring rotational motion from the first output shaft 14, through the transfer clutch 38 to the second output shaft 16.

Preferably, a clutch pack 56 is mounted between the first and second clutch members 40, 42. The clutch pack 56 is adapted to selectively interconnect the first and second clutch members 40, 42. Preferably, the clutch pack 56 includes a plurality of first clutch plates 58 and a plurality of second clutch plates 60. The first clutch plates 58 include teeth formed within an inner diameter which engage corresponding teeth formed within an outer diameter of the first clutch member 40. The second clutch plates 60 include teeth formed within an outer diameter which engage corresponding teeth formed within an inner diameter of the second clutch member 42.

When an axial force is applied to the clutch pack 56, the first and second clutch plates 58, 60 are forced together. If the force is sufficient, friction will prevent the first and second clutch plates 58, 60 from relative rotation, thereby locking the first and second clutch members 40, 42 to one another such that rotational motion is transferred from the first clutch member 40, across the clutch pack 56, to the second clutch member 42.

Preferably, a ball screw assembly 62 is mounted within the transfer case 10 which is adapted to selectively apply an axial force to the clutch pack 56, thereby locking the first and second clutch members 40, 42 together.

Preferably, each ball screw assembly 62 includes a hollow ball screw 64 mounted within the housing 12, about the first output shaft 14. The ball screw 64 includes an outer surface having an outwardly facing helical channel 66 formed therein. A ball nut 68 extends circumferentially around the ball screw 64. The ball nut 68 includes an inner surface having an inwardly facing helical channel 70 formed therein. The inwardly facing helical channel 70 of the ball nut 68 and the outwardly facing helical channel 66 of the ball screw 64 define a ball channel.

A plurality of balls 72 are positioned within the ball channel. The balls 72 provide a coupling between the ball screw 64 and the ball nut 68 such that rotational movement of the ball screw 64 and the ball nut 68 relative to one another is translated into axial movement of the ball nut 68 and the ball screw 64 relative to one another. A motor 74 engages the ball nut 68 to rotationally move the ball nut 68 relative to the ball screw 64.

Preferably, the ball screw 64 is rotatably and axially fixed within the housing 12, and the ball nut 68 is rotatable and axially moveable relative to the housing 12. The motor 74 engages the ball nut 68 such that when the motor 74 is activated the ball nut 68 rotates relative to the ball screw 64 and the housing 12, thereby moving the ball nut 68 axially such that the ball nut 68 places an axial force onto the clutch pack 56.

Preferably, the motor 74 is an electric motor that includes a brake 75. The brake 75 will allow the motor 74 to be locked into position when the electric power to the motor 74 is cut off. Therefore, if the clutch pack 56 is to be engaged for an extended period of time, the brake 75 can be engaged, and the power to the motor 74 turned off. In this way, the life of the electric motor 74 can be prolonged. Any type of brake known in the industry for use with an electric motor is suitable.

Preferably, the electric motor 74 includes a planetary gear set 76 to provide a gear ratio between the motor 74 and the ball nut 68. The planetary gear set 76 includes a ring gear 78, a sun gear 80, and a plurality of planet gears 82 mounted within a planetary carrier and positioned between and interconnecting the sun gear 80 and the ring gear 78. The electric motor 74 includes a stator and a rotor, and the ring gear 78 is mounted to the stator while the sun gear 80 is mounted to the rotor.

Figure 4:
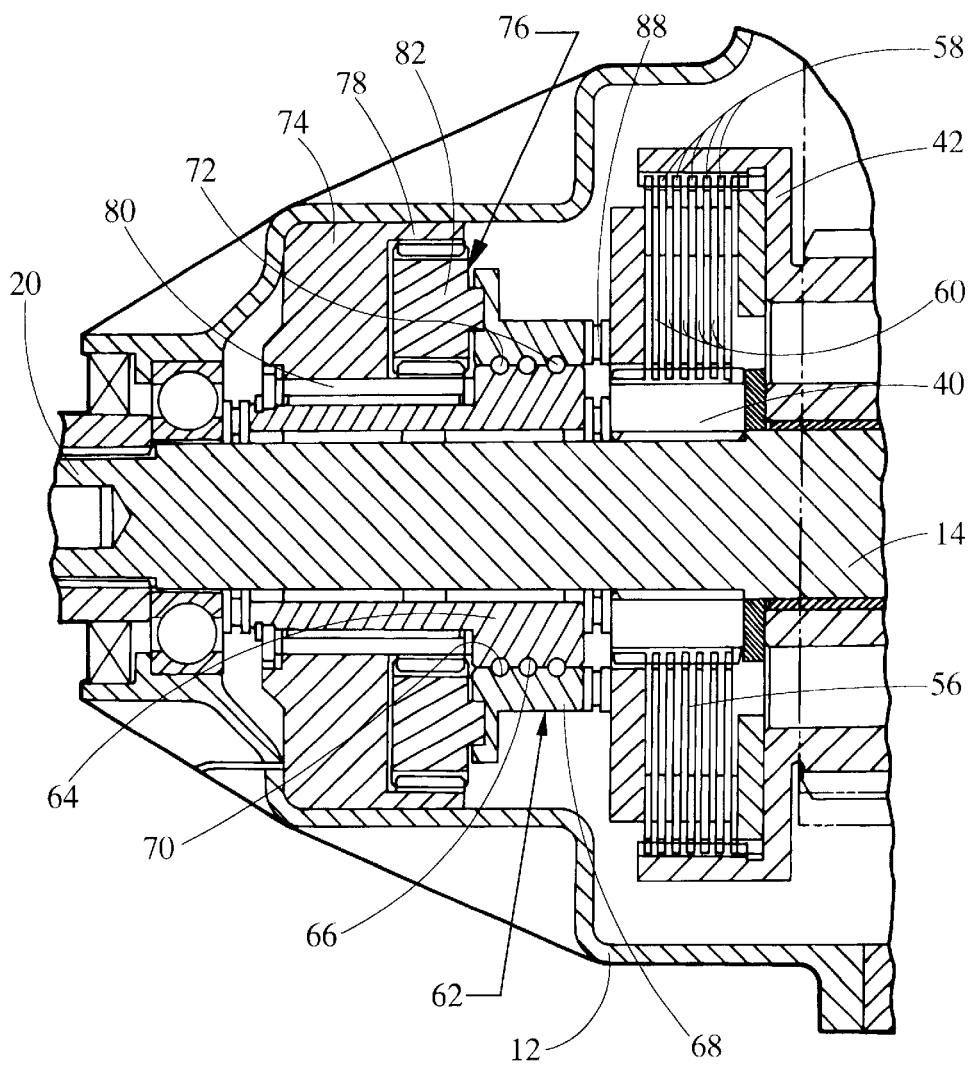
FIG. 4 is an enlarged view of a portion of FIG. 3.

Referring to FIGS. 3 and 4, in a first preferred embodiment, the electric motor 74 is a hollow motor 74 which is mounted within the housing 12 and extends circumferentially around the first output shaft 14. The ball nut 68 is attached to the planetary carrier 83 such that as the planetary carrier 83 rotates, the ball nut 68 rotates about the ball screw 64. As the ball nut 68 rotates, the ball nut 68 moves axially relative to the housing 12. The ball nut 68 moves axially toward the clutch pack 56 such that the ball nut 68 applies an axial force to the clutch pack 56, thereby locking the first and second clutch members 40, 42 together and transferring rotational motion from the first output shaft 14 to the second output shaft 16.

Figure 5:
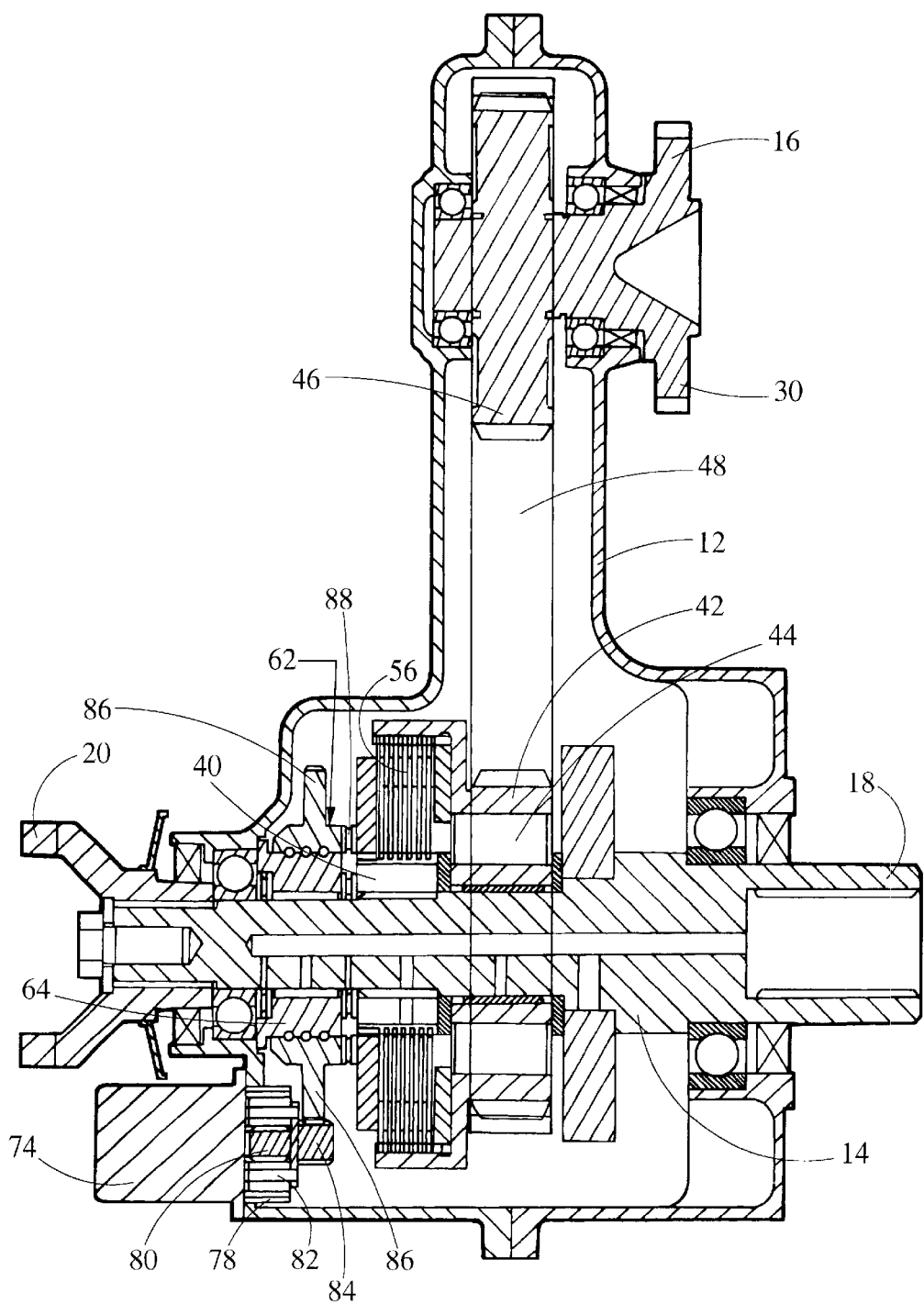
FIG. 5 is a sectional view similar to FIG. 3 of a second preferred embodiment.

Referring to FIG. 5, in a second preferred embodiment, the ball nut 68 includes a first spur gear 86 and the motor 74 includes a second spur gear 84. The motor 74 is mounted external to the differential housing 12, and the second spur gear 86 is mounted to the planetary carrier 83 such that as the planetary carrier 83 rotates, the second spur gear 84 will engage the first spur gear 86 and rotate the ball nut 68. As the ball nut 68 rotates, the ball nut 68 moves axially relative to the housing 12. The ball nut 68 moves axially toward the clutch pack 56 such that the ball nut 68 applies an axial force to the clutch pack 56, thereby locking the first and second clutch members 40, 42 together and transferring rotational motion from the first output shaft 14 to the second output shaft 16.

In both the first and second preferred embodiments, the ball screw assembly 62 provides axial force to the clutch pack 56 that is not dependant upon wear within the clutch pack 56 or within the ball screw assembly 62. As the clutch plates 58, 60 within the clutch pack 56 wear, the ball screw assembly 62 can progress further axially toward the clutch pack 56, thereby providing the same axial force to the clutch pack 56 as when the clutch plates 58, 60 were new. The axial force exerted upon the clutch pack 56 is controlled by the motor 74, therefore, the ball screw assembly 62 will always advance until the axial force being exerted reaches the limitations of the motor 74. Therefore, the transfer case 10 having a ball screw assembly 62 to actuate the clutch pack 56 is self-adjusting as the clutch pack 56 wears.

Additionally, the ball screw assembly 62 can be reversed. Generally, the ball screw assembly 62 will reverse only enough to allow relative rotational movement between the first and second clutch plates 58, 60 of the clutch pack 56, thereby rotationally disconnecting the first output shaft 14 from the second output shaft 16. However, under certain circumstances, it may be desirable to back the ball screw assembly 62 away from the clutch pack 56 even further to allow the clutch plates 58, 60 within the clutch pack 56 to cool. This is easily accomplished with the ball screw assembly 62.

Further, the ball screw assembly 62 uses many balls 72. Preferably, approximately fifty balls 72 are positioned within the ball channel. Typically in a ball ramp type actuator three or four balls support the entire axial load. The ball screw assembly 62 provides a larger number of ball bearings 72 to support the load, resulting in more even loading and less wear within the ball screw assembly 62.

Preferably, a thrust bearing 88 is positioned between the ball screw assembly 62 and the clutch pack 56. The thrust bearing 88 will allow axial force to be transferred from the ball screw assembly 62 to the clutch pack 56 while allowing the ball nut 68 to rotate relative to the clutch pack 56.

The foregoing discussion discloses and describes two preferred embodiments of the invention. One skilled in the art will readily recognize from such discussion, and from the accompanying drawings and claims, that changes and modifications can be made to the invention without departing from the scope of the invention as defined in the following claims. The invention has been described in an illustrative manner, and it is to be understood that the terminology which has been used is intended to be in the nature of words of description rather than of limitation.

What is claimed is:

1. A transfer case for use in motor vehicles for transferring drive torque from a powertrain to first and second drivelines, said transfer case comprising:

a first output shaft, connected to the powertrain of the vehicle and adapted to transmit drive torque from the powertrain to the first driveline;

a second output shaft adapted to transmit drive torque to the second driveline;

a transfer clutch adapted to selectively transfer drive torque from said first output shaft to said second output shaft; and a ball screw assembly adapted to actuate said transfer clutch, said ball screw assembly including a hollow ball screw mounted within said transfer case, about said first output shaft, and including an outer surface having an outwardly facing helical channel formed therein, a hollow ball nut extending circumferentially around said ball screw and including an inner surface having an inwardly facing helical channel formed therein, a ball channel defined by said inwardly facing helical channel and said outwardly facing helical channel, a plurality of ball bearings positioned within said ball channel, thereby coupling said ball screw and said ball nut such that rotational movement of said ball screw and said ball nut relative to one another is translated into axial movement of said ball nut and said ball screw relative to one another; and an electric motor, having a stator and a rotor, adapted to engage said ball nut to rotationally move said ball nut relative to said ball screw;

said motor further including a planetary gear set having a ring gear, a sun gear and a plurality of planet gears secured within a planetary carrier between and interconnecting said ring gear and said sun gear, said ring gear being attached to said stator, and said sun gear being attached to said rotor;

said ball screw being rotatably and axially fixed within said transfer case and said ball nut being rotatably and axially moveable relative to said transfer case, said motor engaging said ball nut such that when said motor is activated said ball nut rotates relative to said ball screw and said transfer case, thereby moving said ball nut axially relative to said transfer case such that said ball nut applies an axial force to said clutch packs, thereby rotationally connecting said first and second clutch members and rotationally connecting said first and second output shafts.

2. The transfer case of claim 1 wherein said transfer clutch includes a first clutch member supported on said first output shaft, a second clutch member coupled for rotation with said second output shaft, and a clutch pack mounted between said first and second clutch members and adapted to transfer rotational movement between said first and second clutch members.

3. The transfer case of claim 1 wherein said clutch pack includes a plurality of first clutch plates, and a plurality of second clutch plates, each of said first clutch plates having a plurality of teeth formed on an inner diameter thereof, said teeth of said first clutch plates engaging corresponding teeth formed within an outer diameter of said first clutch member, each of said second clutch plates having a plurality of teeth formed on an outer diameter thereof, said teeth of said second clutch plates engaging corresponding teeth formed within an inner diameter of said second clutch member, said first and second clutch plates being interlaced with one another such that when said first and second clutch plates are compressed against one another, friction between said clutch plates will prevent said first and second clutch members from rotating relative to one another such that rotational motion is transferred from said first output shaft to said second output shaft across said clutch pack.

4. The transfer case of claim 3 wherein said second clutch member includes a first sprocket and said second output shaft includes a second sprocket, said transfer clutch including a chain extending around and interconnecting said first and second sprockets such that rotational movement is transferred therebetween.

5. The transfer case of claim 1 wherein each of said motors is a hollow motor mounted within said transfer case and said ball nuts are attached to said planetary carrier such that rotational movement of said planetary carrier rotates said ball nut relative to said transfer case.

6. The transfer case of claim 5 wherein said ball screw is connected to said stator such that said ball screw cannot rotate relative to said stator.

7. The transfer case of claim 1 wherein said ball nut includes a first spur gear, and said motor includes a second spur gear mounted to said planetary carrier and engaging said first spur gear such that rotational movement of said planetary carrier rotates said ball nut relative to said transfer case.

8. The transfer case of claim 1 further including a thrust bearing positioned between said ball screw assembly and said clutch pack.

\* \* \* \* \*

UNITED STATES PATENT AND TRADEMARK OFFICE
CERTIFICATE OF CORRECTION

PATENT NO. : 6,780,132 B2
DATED : August 24, 2004
INVENTOR(S) : Dennis Cook et al.

It is certified that error appears in the above-identified patent and that said Letters Patent is hereby corrected as shown below:

Column 6,
Lines 37-38, delete "each of said motors" and substitute -- said motor -- in its place.
Line 39, delete "ball nuts are" and substitute -- ball nut is -- in its place.

Signed and Sealed this

First Day of February, 2005

JON W. DUDAS
*Director of the United States Patent and Trademark Office*